United States Patent [19]

Smith

[11] Patent Number: 5,456,449
[45] Date of Patent: Oct. 10, 1995

[54] WEED REMOVAL TOOL

[76] Inventor: Francis P. Smith, 98090 W. Benham #5, Brookings, Oreg. 97415

[21] Appl. No.: 179,303

[22] Filed: Jan. 10, 1994

[51] Int. Cl.$^6$ .................................................. B66F 3/00
[52] U.S. Cl. ............................................ 254/132; 294/50.8
[58] Field of Search ................... 294/50.5, 50.8, 294/50.9; 254/132, 131.5

[56] References Cited

U.S. PATENT DOCUMENTS

| | | |
|---|---|---|
| 110,211 | 12/1870 | Davis . |
| 287,677 | 10/1883 | Higinbotham et al. . |
| 626,966 | 6/1899 | Conzett . |
| 779,984 | 1/1905 | Allen . |
| 1,044,806 | 11/1912 | O'Bannon . |
| 1,548,040 | 8/1925 | Johnson .................. 294/50.9 |
| 1,640,732 | 8/1927 | Simpson . |
| 1,687,974 | 10/1928 | Dickie . |
| 1,895,214 | 1/1933 | Stork . |
| 2,035,967 | 3/1936 | Humphrey ............... 294/50.8 |
| 2,185,552 | 1/1940 | Hecox . |
| 2,394,568 | 2/1946 | Stewart . |
| 2,422,929 | 6/1947 | Roller . |
| 2,451,952 | 10/1948 | Hulsebus ............... 294/50.8 |
| 2,735,712 | 2/1956 | Hart ...................... 294/50.5 |
| 2,749,088 | 6/1956 | Jennens . |
| 4,813,728 | 3/1989 | Genser .................. 294/50.8 |

*Primary Examiner*—Robert C. Watson
*Attorney, Agent, or Firm*—Klarquist Sparkman Campbell Leigh & Whinston

[57] ABSTRACT

A weed removal tool having a pair of upright elongated handles pivotally attached to each other near their lower ends, with protruding tapered tines extending axially from the lower ends of the handles. The tool is operated by plunging the tines into the ground on opposite sides of a weed, and separating the handles to compress the weed between the tines. A fulcrum block attached to one of the handles near the tines provides leverage for extracting the weed upon lateral tilting of the handles to force the block into the ground. The weed may then be lifted freely from the ground.

12 Claims, 2 Drawing Sheets

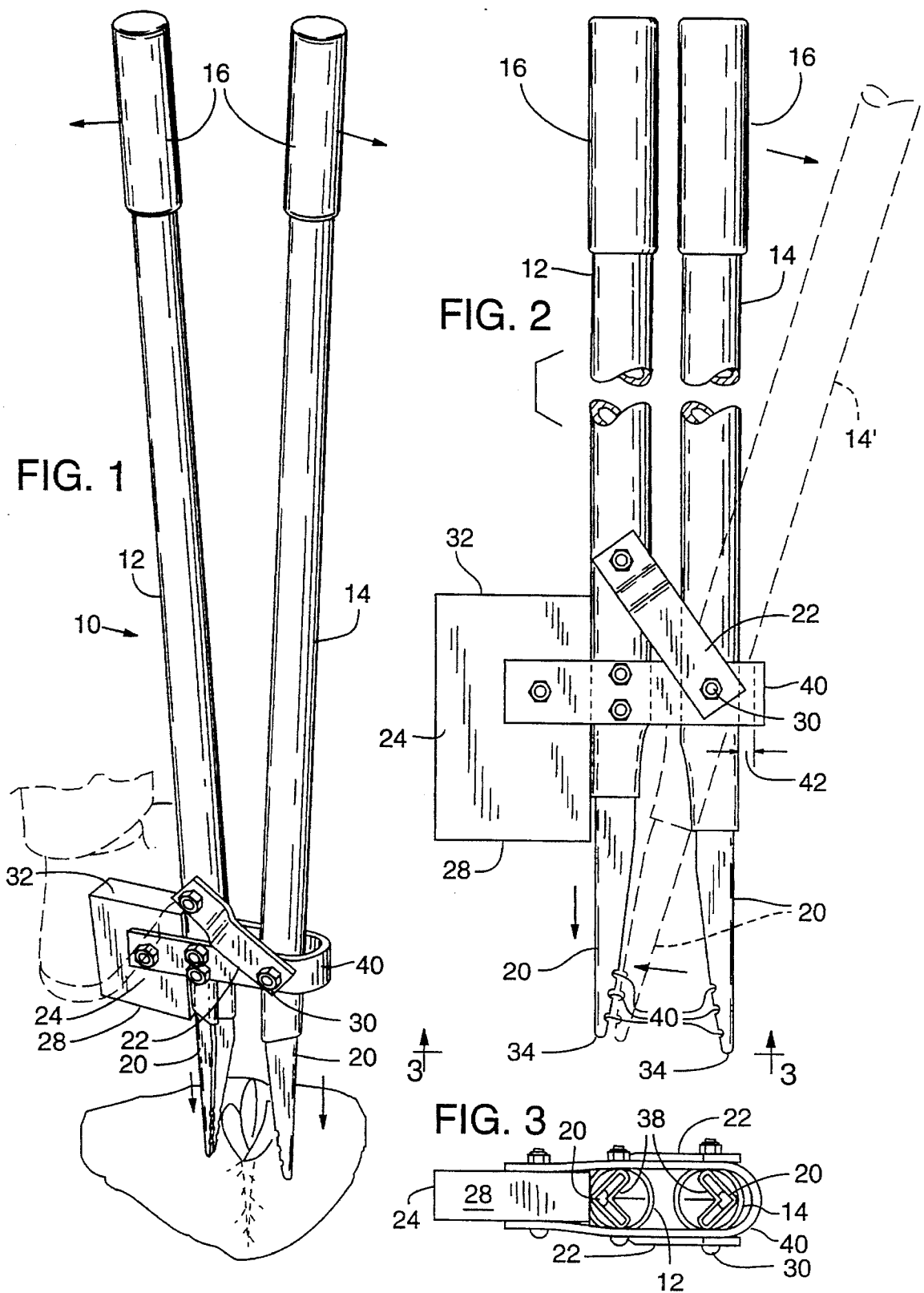

WEED REMOVAL TOOL

FIELD OF THE INVENTION

This invention relates to an apparatus for removing weeds from a lawn. More particularly, the invention relates to a hand-operated weed removal tool.

BACKGROUND AND SUMMARY OF THE INVENTION

Weed removal tools are used in circumstances in which it is undesirable or uneconomical to use chemical weed killers. Some such tools are hand tools that are unsuitable for extended use, as they require the user to crouch in an uncomfortable or unhealthy position. Such hand tools are also unsuitable for users with disabilities or infirmities that preclude repeated crouching, and which limit the hand strength generally required.

Other existing weed pullers are also unsuitable for extracting long-rooted weeds from lawns without unsightly or unhealthy disruption or removal of grass near the weed. Some weed pullers extract a large amount of turf and associated soil along with the weed; others extract only an upper portion of the weed without effectively removing a substantial amount of the weed's root.

The primary objects of the invention are to provide:

1. A weed removal tool capable of removing deeply rooted weeds without appreciable disruption of surrounding soil and turf.

2. A weed removal tool suitable for use by an upright or seated user.

3. A weed removal tool that provides a mechanical advantage to permit effective operation by a user with limited hand strength or upper body strength.

According to the present invention, the primary objects are achieved by providing a weed removal tool having a pair of elongated poles that are attached to each other at a pivot connection, with each pole having a tapered tine at its lower end, and a handle at its upper end. The pivot connection is positioned near the tines to provide a substantial mechanical advantage, and the poles are long enough to permit operation by an upright user. A fulcrum block attached to the side of one of the poles near the tines provides further mechanical advantage to assist the extraction of weeds upon tilting of the tool in the direction of the fulcrum block, forcing the block against the ground to dislodge the weed.

The foregoing and additional features and advantages of the present invention will be more readily apparent from the following detailed description, which proceeds with reference to the accompanying drawings.

BRIEF DESCRIPTION OF THE DRAWINGS

FIG. 1 is a perspective view of an apparatus according to the present invention.

FIG. 2 is a side view of the apparatus of FIG. 1.

FIG. 3 is a bottom view of the apparatus of FIG. 1.

DETAILED DESCRIPTION OF A PREFERRED EMBODIMENT

Figure 4A:
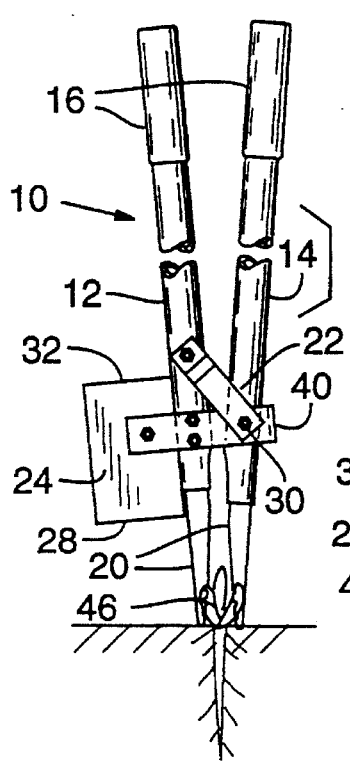
FIGS. 4A–4F comprise a series of side views illustrating the function of the apparatus of FIG. 1.

FIG. 1 shows a weed puller 10 having a pair of elongated handle members 12 and 14. Each handle member includes a hand grip 16 at its upper end, and a tapered elongated tine 20 protruding axially from its lower end. Handle 12 includes a rigidly secured bracket assembly 22, to which a fulcrum block 24 is rigidly secured. The fulcrum block extends laterally away from handle 14 for the block width, and has a lower ground engaging surface 28 facing downward in the direction that the tines protrude. The distance between the lower surface 28 and the tip of the tines 20 defines the effective length of the tines, as the lower surface 28 presses against the ground surface to prevent the tines from being inserted to an excess depth in the ground.

The handle 14 is pivotally attached to the bracket 22 by a bolt 30 that passes through a hole in the handle 14, and which bolt defines a pivot axis spaced apart from handle 12.

As shown in FIG. 2, the pivot bolt 30 is spaced apart from handle 12 so that handle 14 may pivot to a closed position 14', in which the tines 20 are brought into contact or nearly into contact, and in which the upper ends of the handles are separated. In the preferred embodiment, the handles in the closed position are angularly offset from each other by about 15–20 degrees. The parallel, or open, position is shown in FIG. 1. Thus, with a three-foot tall device, the hand grips 16 become spaced apart by only about one foot in the open position. Conveniently, it is easier for a user to gain leverage to apply substantial force with the hands reasonably close together. The limited handle spacing in the closed position provides comfortable operation, even by users without substantial strength.

The fulcrum block 24 includes an upper foot engaging surface 32 that may be used as a step on which the operator presses his foot provide additional force sometimes needed to insert the tines of the apparatus into hard soil. The upper foot engaging surface 32 is spaced from the lower ground engaging surface 28 by a block height greater than the block width. FIG. 1 illustrates how the operator may position his foot.

Each tine 20 is a rigid angled member formed from right angle bar stock, ¾ inches on each side and having ⅛ inch wall thickness. The tines are preferably formed of aluminum, although steel may also be employed. The tines are tapered toward their tips 34, with the taper being about a 10 degree angle cut from the surfaces of the tines that face each other. Consequently, the tines are tapered as viewed from all lateral directions, with tips no wider than ⅜ inch in any lateral dimension. This provides a small entry hole in the ground from which a weed is to be removed, minimizing disruption of the soil and permitting insertion of the tines in particularly hard soil.

As shown in FIG. 3, the opposed faces of the tines define right angle channels 38, which receive the root of a weed and a minimal amount of associated soil. As shown in FIG. 2, the opposed faces are serrated with horizontal grooves 40 to avoid slippage when a weed is being extracted from the soil.

In the preferred embodiment, the handles are hollow tubes at their lower ends, and the tines are secured to the handles by crimping the tubular lower ends of the handles to conform to the angled profile of the tines. The tines may further be secured by welding, adhesives, fasteners or any other conventional means.

EXAMPLE

In the preferred embodiment, the handles are one inch in diameter, and are formed of aluminum or fiberglass tubing, or of wooden dowels, and extend vertically three feet above the pivot bolt 30. The tines extend about 6 inches below the pivot bolt, with the fulcrum block being positioned so that its lower surface is 3 inches above the tips of the tines. The fulcrum block measures ¾ inch thick, 3¾ inches tall, and 2½ inches wide. The bracket assembly 22 includes a U-shaped member 40, as shown in FIG. 1, and which wraps around handle 14 to define a limited gap 42, as shown in FIG. 2, which limits the range of angular pivoting when the tines are not configured for direct contact.

OPERATION

In FIG. 4A, the apparatus is shown with the tines positioned above a weed 46, with the hand grips 16 spread slightly, so that the tips of the tines are spaced apart only slightly wider than the width of the weed. The center of the weed is centrally aligned between the tines.

Figure 4B:
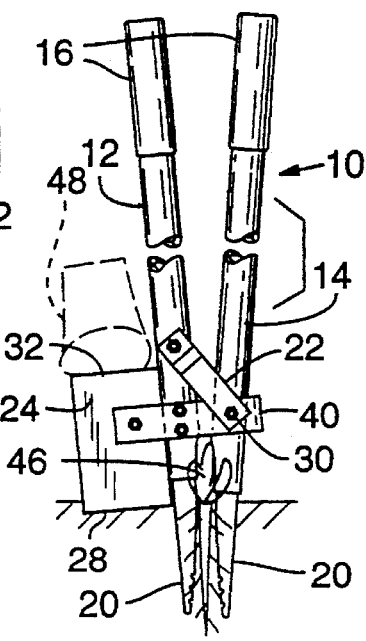
Figure 4C:
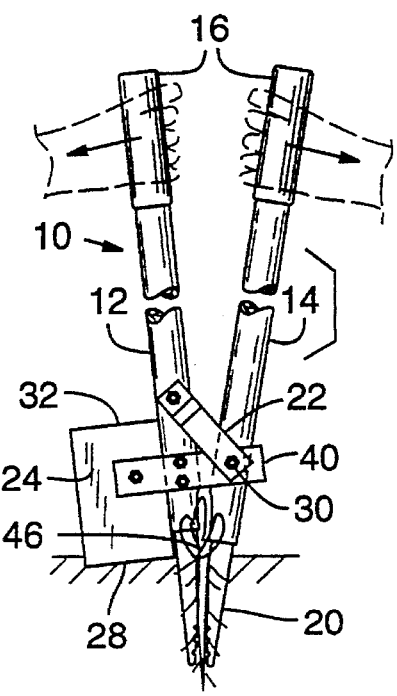

In FIG. 4B, the operator's foot 48 presses down on the fulcrum block 24 to force the tines into the ground until the lower surface 28 of the block contacts the surface of the ground. In FIG. 4C, the hand grips are spread apart forcefully by the operator to compress the root of the weed within the channels 38 of the tines 20.

Figure 4D:
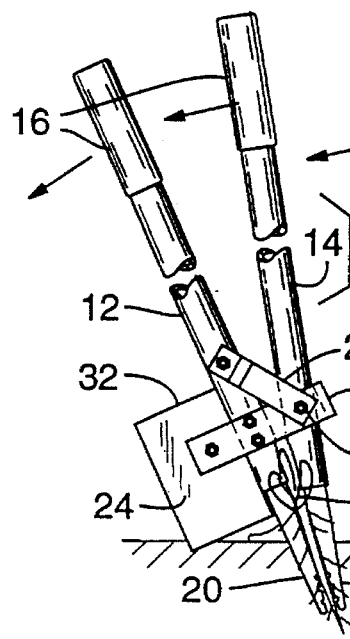
Figure 4E:
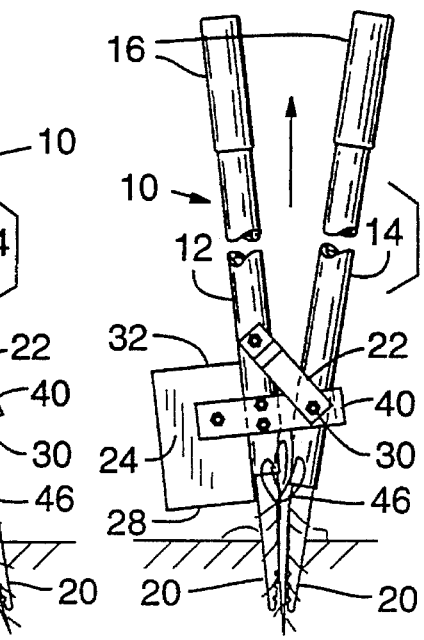

In FIG. 4D, the weed puller 10 is tilted laterally in the direction of the fulcrum block 24 so that the lower surface 28 of the block presses downward on the ground, providing leverage to dislodge the weed from the ground. The operator continues to force apart the handles while tilting the apparatus. With the weed dislodged as shown in FIG. 4E, the entire apparatus and weed may be lifted upward, with limited force.

Figure 4F:
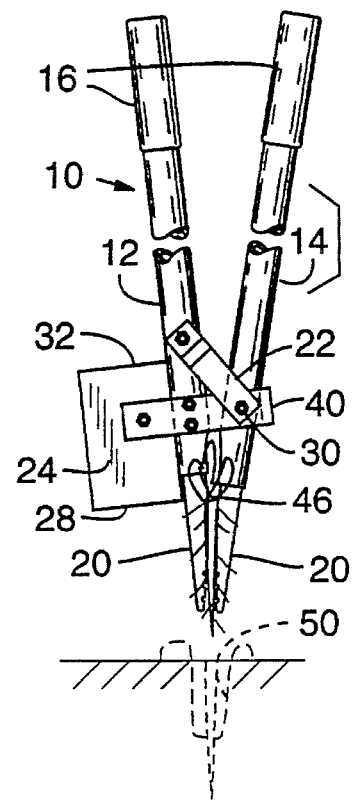

As shown in FIG. 4F, the narrow tines leave a limited cavity 48 in which the soil has been disrupted. When in the closed position, the tines together present a cross-sectional profile in the plane of the lower surface of the fulcrum block that is less than 1½ inches by 1 inch. Because of the shape of this profile, the maximum aperture at the surface of the cavity is about 1 in.² in area. Furthermore, because the cavity is formed at least in part by compression of the soil, the cavity size readily diminishes upon removal of the tool.

Having illustrated and described the principles of the invention by what is presently a preferred embodiment, it should be apparent to those skilled in the art that the illustrated embodiment may be modified without departing from such principles. For instance, one such contemplated modification involves the shortening of the handles to provide a hand tool that may be used in flower boxes and the like. Such a tool may have a handle length of one to two feet, with the reduction in leverage being tolerable for use in softer soils. The effective length of the tines may be shortened to increase the leverage, if necessary. A leverage advantage of at least 2:1 is preferred in any contemplated embodiment, although 4:1 or better is generally preferred. The invention is claimed not only as the illustrated embodiment, but including all such modifications, variations and equivalents thereof which come within the true spirit and scope of the following claims.

I claim:

1. A weed removal tool comprising:

a pair of elongate members pivotally connected to each other, each member having an upper end including a hand grip and an opposed lower end having an axially protruding elongated tine terminating at a tip, the two hand grips being separate from each other, and the two tines being separate from each other, the elongate members being pivotable through a range of motion between a closed position in which the handles are separated and the tines approach contact with each other to grip a weed therebetween, and an open position in which the tines are separated and the handles are proximate each other;

the elongate members being joined at a hinge junction defining a pivot point nearer to the tine tips than to the upper ends; and a fulcrum block attached to at least one of the elongate members at a position above the tine and extending laterally therefrom by a block width at a position nearer the tine tips than the hand grips;

said fulcrum block having an upper foot engaging surface and a lower ground engaging surface spaced from said upper surface by a block height greater than said block width to enable the tool to pull the weed from the ground by pivoting said tool about said fulcrum block with the elongate members in the closed position.

2. The apparatus of claim 1 wherein the distance between the pivot point and the tine tips is less than half the distance between the pivot point and the upper ends.

3. The apparatus of claim 1 wherein the distance between the pivot point and the tine tips is less than eight inches.

4. The apparatus of claim 1 wherein each tine defines an elongated groove open toward the opposite tine to define a channel for capturing a weed when the apparatus is in the closed position.

5. The apparatus of claim 4 where each tine defines an L-shaped cross section.

6. The apparatus of claim 1 wherein at least one of the tines is tapered.

7. The apparatus of claim 1 wherein at least one of the tines has width and depth dimensions perpendicular to its length, and wherein said tine is tapered in width and tapered in depth.

8. A weed removal tool comprising:

a pair of elongate members pivotally connected to each other, each member having an upper end including a hand grip and an opposed lower end having an axially protruding elongated tapered tine connected to the member, each tine terminating at a tip, each tine defining an elongated groove for capturing a weed, the members being pivotable through a range of motion between a closed position in which the handles are separated and the tines approach contact with each other to grip a weed therebetween, and an open position in which the tines are separated and the handles are proximate each other for insertion of the tines into the ground on opposite sides of the weed, said upper ends of said pair of elongate members being separated in said closed position by a spacing many times greater than their spacing in said open position;

the elongate members being joined at a hinge junction defining a pivot point nearer to the tine tips than to the upper ends, the distance between the pivot point and the tine tips being less than half the distance between the pivot point and the upper ends;

a U-shaped member attached to the lower end of the one elongate member and surrounding the lower end of the other elongate member to limit its pivoting movement about a pivot connection on said U-shaped member; and a fulcrum block attached to at least one of the elongate members and extending laterally therefrom at a position nearer the tine tips than the hand grips, said fulcrum block having a ground engaging lower surface positioned to enable weed removal by pivoting said tool about said fulcrum block with the elongate members in the closed position and the lower surface in engagement with the ground.

9. A tool in accordance with claim 8 in which the two hand grips of the elongate members are separate from each other.

10. A tool in accordance with claim 9 in which the two tines are separate from each other.

11. A tool in accordance with claim 8 in which the fulcrum block is attached to the one elongate member at a position above the connection of the tine to said member.

12. A weed removal tool comprising:

a pair of elongate members pivotally connected to each other, each member having an upper end including a hand grip and an opposed lower end having an axially protruding elongated tapered tine connected to the member, each tine terminating at a tip, each tine defining an elongated groove for capturing a weed, the members being pivotable through a range of motion between a closed position in which the handles are separated and the tines approach contact with each other to grip a weed therebetween, and an open position in which the tines are separated and the handles are proximate each other for insertion of the tines into the ground on opposite sides of the weed, said upper ends of said pair of elongate members being separated in said closed position by a spacing many times greater than their spacing in said position;

the elongate members being joined at a hinge junction defining a pivot point nearer to the the tine tips than to the upper ends, the distance between the pivot point and the tine tips being less than half the distance between the pivot point and the upper ends; and a fulcrum block attached to at least one of the elongate members and extending generally therefrom at a position nearer the tine tips than the hand grips, said fulcrum block having a ground engaging lower surface positioned to enable weed removal by pivoting said tool about said fulcrum block with the elongate members in the closed position and the lower surface in engagement with the ground;

in which the fulcrum block has an upper surface spaced above the lower surface by a block height greater than the block width extending laterally from the one elongate member.

* * * * *

UNITED STATES PATENT AND TRADEMARK OFFICE
CERTIFICATE OF CORRECTION

PATENT NO. : 5,456,449
DATED : October 10, 1995
INVENTOR(S) : Francis P. Smith

It is certified that error appears in the above-identified patent and that said Letters Patent is hereby corrected as shown below:

Column 6, line 3: After "said" insert --open--; and line 10: Change "generally" to --laterally--.

Signed and Sealed this

Seventh Day of May, 1996

Attest:

BRUCE LEHMAN

Attesting Officer

Commissioner of Patents and Trademarks